United States Patent Office 3,226,189
Patented Dec. 28, 1965

3,226,189
METHOD OF PREPARING SILICA-FREE
ALUMINUM SULPHATE SOLUTION
Stanislaw Bretsznajder, Warsaw, Poland, assignor to Instytut Chemii Ogolnej, Warsaw, Poland
No Drawing. Filed July 3, 1962, Ser. No. 207,377
Claims priority, application Poland, July 14, 1961,
P 96,950
2 Claims. (Cl. 23—123)

One of the methods of producing aluminum sulphate from non-calcined clay or other aluminosilicates involves treatment of the raw material with sulphuric acid in an autoclave at a temperature higher than the normal boiling point of the solution. Under these conditions, nearly all aluminum present in the raw material passes into solution as the sulphate. At the same time some colloidal silica passes into solution.

After decomposition, the contents of the autoclave is filtered to remove insoluble materials such as silica, sand, unreacted clay, feldspar, etc. It is known from practice that colloidal silica cannot be separated by filtration because it passes with ease through filter cloth thereby contaminating the aluminum sulphate and rendering it unsuitable for some purposes.

One method used so far to precipitate colloidal silica from the aluminum sulphate solution involves concentration of the solution to more than 300 g. of $Al_2(SO_4)_3$ per 1 liter along with prolonged heating at a temperature a few degrees centigrade below the boiling point. Under these conditions slow coagulation takes place, the colloidal silica precipitates and can be filtered off.

In another known method of preparing aluminum sulphate, the calcined clay is treated in an autoclave with ammonium bisulphate and the product is filtered to separate the precipitate composed chiefly of silica. The filtrate which contains major part of the aluminum oxide, half the oxide of iron, one third of the titanium oxide and minor parts of other components present in the starting clay material, is concentrated in the presence of ammonium sulphate to precipitate silica which is filtered off.

The technical literature mentions also a method for removal of silica involving concentration of the solution to at least 40% $Al_2(SO_4)_3$ in the presence of granular silica as catalyst.

Also well-known is the precipitation of silica on concentrating technical-grade aluminum sulphate solutions in open pans to the concentration of commercial product, i.e. 14% $Al_2(SO_4)_3$, but the precipitate thus obtained entails serious difficulties in separation owing to high melting temperature and high viscosity of the solution. From experence in practice it follows that all the methods of removal of silica involving concentration of the aluminum sulphate solution are expensive and heat-consuming.

It is evident from the foregoing description of the methods of preparation of the aluminum sulphate solution that the colloidal solution of silicic acid is formed irrespective of whether the process is run at large concentrations of ammonium salts (treatment with ammonium bisulphate) or in sulphuric acid as solvent.

It has now been discovered that, unpredictably from the present state of knowledge, a small amount of ammonium salt, e.g. 0.4% by weight of ammonium sulphate, added to the sulphuric acid solution used for digesting clay or other aluminosilicates in the autoclave, prevents the passing of colloidal silica into the solution. In this particular case, the ammonum ions cause coagulation of colloidal silica the particles of which agglomerate and are retained on the filter during filtration after decomposition.

According to the new method, the sulphuric acid solution used to decompose clay or other aluminosilicates contains at least 0.1% by weight of ammonia in the ammonium sulfate form, e.g. as the ammonium sulphate. After decomposition of the raw material in a customary manner, an aluminum sulphate solution is obtained which contains no silica detectable by the conventional analytical methods. If the ammonium salts added to coagulate the colloidal silica are undesirable in the aluminum sulphate solution, the filtrate is cooled to ambient temperature, aluminum ammonium alum is crystallized and the crystals are separated from the solution without difficulty.

Doubtless the new method is superior to the existing methods. The process results in a silica-free aluminum sulphate solution and avoids prolonged and expensive evaporation and troublesome repeated filtration.

Example I.—In a lead-lined 1 liter autoclave equipped with a stirrer, 100 g. of ground and dried clay analyzing 28.3% $Al_2O_3$ and 3.1% $Fe_2O_3$, 700 ml. water and 50 ml. sulphuric acid (sp. gr. 1.84), was introduced. The autoclave was closed and heated until a pressure of 4 atm. was attained; this pressure was maintained for 8 hrs. Then the autoclave was cooled to a temperature of 80° and its contents was filtered. The resulting solution of technical-grade aluminum sulphate contained 108.0 g. $Al_2(SO_4)_3$ per 1 liter. Analysis showed that the filtrate contained 0.082 g. colloidal silica per 1 liter. To separate this silica, the solution was evaporated to one third of the original volume and heated 4 hrs. at 102°. Then the resulting precipitate of silica was filtered off, the solution was made up to the original volume and silica was determined. The solution was thus found to contain 0.0013 g. $SiO_2/1$ liter—generally regarded as an efficient removal of silica.

Example II.—Clay, water and sulphuric acid were introduced into the autoclave in the amounts as in Example I, and 3 g. of ammonium sulphate was added. After the reaction was carried out as in Example I, the precipitate was filtered off and the solution that contained 106.8 g. $Al_2(SO_4)_3$ and 0.0009 g. $SiO_2$ per 1 liter, was obtained.

From the above quoted examples it follows that the new method furnishes an aluminum sulphate solution with the proportion of silica reduced to one hundredth of that obtained by the first method, i.e. an excellent removal of silica is accomplished with no troublesome concentration of the solution and additional filtration of silica.

What I claim is:
1. A method of preparing a solution of aluminum sulphate free from silica which comprises digesting a member selected from the group consisting of non-calcined clays and aluminosilicates by treating with sulphuric acid at a temperature higher than the normal boiling point of the solution, characterized by carrying out the reaction with a sulphuric acid solution containing combined ammonia in the form of ammonium sulfate in a range of from about 0.1% based on the solution weight to about 0.4%, and, following digestion separating the insoluble residue from the solution.
2. A method as claimed in claim 1 characterized by cooling the resulting solution to ambient temperature to form aluminum ammonium alum crystals, and separating the thus formed crystals.

References Cited by the Examiner
UNITED STATES PATENTS
914,187    3/1909    Rinman _____ 23—118 X
FOREIGN PATENTS
25,683    9/1903    Great Britain.
of 1902

MAURICE A. BRINDISI, Primary Examiner.